(12) United States Patent
Yunoki (10) Patent No.: US 11,418,430 B2
(45) Date of Patent: Aug. 16, 2022

(54) QOS MANAGEMENT SYSTEM AND METHOD

(71) Applicant: Hitachi, Ltd., Tokyo (JP)

(72) Inventor: Shoji Yunoki, Santa Clara, CA (US)

(73) Assignee: HITACHI, LTD, Tokyo (JP)

( * ) Notice: Subject to any disclaimer, the term of this patent is extended or adjusted under 35 U.S.C. 154(b) by 0 days.

(21) Appl. No.: 17/109,709

(22) Filed: Dec. 2, 2020

(65) Prior Publication Data

US 2022/0174002 A1 Jun. 2, 2022

(51) Int. Cl.
*H04L 45/302* (2022.01)
*H04L 45/121* (2022.01)
*H04L 45/42* (2022.01)

(52) U.S. Cl.
CPC .......... *H04L 45/302* (2013.01); *H04L 45/121* (2013.01); *H04L 45/42* (2013.01)

(58) Field of Classification Search
CPC ..... H04L 45/121; H04L 45/302; H04L 45/42; H04L 47/10; H04L 47/24; H04L 47/2491
See application file for complete search history.

(56) References Cited

U.S. PATENT DOCUMENTS

| | | | |
|---|---|---|---|
| 2006/0088034 A1* | 4/2006 | Santitoro | H04L 47/2441 370/395.21 |
| 2013/0003599 A1* | 1/2013 | Zakrzewski | H04W 48/18 370/328 |
| 2017/0078208 A1* | 3/2017 | Panin | H04L 47/24 |
| 2017/0103101 A1* | 4/2017 | Mason | G07C 5/008 |
| 2018/0213444 A1* | 7/2018 | Khawand | H04W 28/0268 |
| 2019/0069195 A1 | 2/2019 | Makinen et al. | |
| 2020/0107313 A1* | 4/2020 | Zhang | H04L 41/5032 |
| 2020/0351208 A1* | 11/2020 | Lee | H04L 47/20 |
| 2021/0136621 A1* | 5/2021 | Nishimura | H04W 4/30 |

* cited by examiner

*Primary Examiner* — Jeong S Park
(74) *Attorney, Agent, or Firm* — Procopio, Cory, Hargreaves 8 Savitch LLP (57) ABSTRACT

Example implementations are directed to management of a system involving a plurality of apparatuses executing manufacturing processes based on instructions from a server, the plurality of apparatuses communicating with the server through a gateway, and can include managing a relationship between a Quality of Service (QoS) level for communications and the manufacturing processes; and controlling the gateway to adjust the QoS level for the communications between each of the plurality of apparatuses and the server based on the manufacturing processes.

15 Claims, 11 Drawing Sheets

| QoS level | Communication delay [ms] | Process type |
|---|---|---|
| 1 | 1 | Polishing parts |
| 2 | 10 | Screw driving |
| 3 | 100 | Cutting material into parts |

| QoS level | Communication delay | Maximum QoS resource [process groups] | Process type | Worker machine collaboration |
|---|---|---|---|---|
| 1 | 1 | 2 | Polishing parts | No |
| 2 | 10 | 2 | Screwdriving (worker machine cooperation) | Yes |
| 3 | 100 | 2 | Cutting material into parts | No |

| Process No. | Manufacturing process type | Progress | Communication pattern No. | Communication source / destination | Data to be transmitted |
|---|---|---|---|---|---|
| 1 | Cutting materials into parts | Delayed | 1 | A1 → S1 | Cutting machine's internal sensor |
| | | | 2 | S1 → A1 | Control signal to cutting machine |
| 2 | Polishing parts | On Time | 1 | B1 → S1 | Polishing machine's internal sensor |
| | | | 2 | S1 → B1 | Control signal to polishing machine |
| 3 | Screw driving (worker machine cooperation) | On Time | 1 | C1 → S1 | Camera |
| | | | 2 | C2 → S1 | Screw driving machine's internal sensor |
| | | | 3 | S1 → C2 | Control signal |

QOS MANAGEMENT SYSTEM AND METHOD

BACKGROUND

Field

The present disclosure is generally directed to data transmission systems, and more specifically, to management of Quality of Service (QoS) for data transmission in factory processes.

Related Art

In recent years, due to the sophistication of processes performed in factories, the importance of networks for communication between devices installed in factories has increased. In factory communications, the communication requirements such as delay and communication speed differ depending on the process to be performed. Moreover, since communication resources are finite, it can be necessary to allocate the minimum necessary communication resources (QoS level) for communication between each device. Related art methods of giving different QoS levels to each device are known. In one example related art implementation, a table for associating the QoS level with the communication performance corresponding to the QoS is used.

SUMMARY

The related art table implementation makes it possible to allocate required communication quality to each communication pattern. However, there are many terminals with different roles in the factory setting, and it is difficult to determine what kind of QoS level should be assigned to those terminals each time. Therefore, the example implementations are directed to systems and methods for efficiently setting the QoS level for factory settings.

In example implementations, the QoS level can be determined from any one or more of QoS features such as based on values for communication delay, bandwidth, packet error rate, packet loss rate information, functions involving combinations thereof, and so on as set as the minimum requirement for the communication. Based on this information, the actual communication is done so as to satisfy the requirement. The QoS level itself is abstracted as a reference number to manage the above QoS features.

Aspects of the present disclosure can involve a method for management of a system involving a plurality of apparatuses executing manufacturing processes based on instructions from a server, the plurality of apparatuses communicating with the server through a gateway, the method involving managing a relationship between a Quality of Service (QoS) level for communications and the manufacturing processes; and controlling the gateway to adjust the QoS level for the communications between each of the plurality of apparatuses and the server based on the manufacturing processes.

Aspects of the present disclosure can involve a computer program, storing instructions for management of a system involving a plurality of apparatuses executing manufacturing processes based on instructions from a server, the plurality of apparatuses communicating with the server through a gateway, the instructions involving managing a relationship between a Quality of Service (QoS) level for communications and the manufacturing processes; and controlling the gateway to adjust the QoS level for the communications between each of the plurality of apparatuses and the server based on the manufacturing processes. The computer program may be stored on a non-transitory computer readable medium and executed by one or more processors.

Aspects of the present disclosure can involve a system for management of a plurality of apparatuses executing manufacturing processes based on instructions from a server, the plurality of apparatuses communicating with the server through a gateway, the system involving means for managing a relationship between a Quality of Service (QoS) level for communications and the manufacturing processes; and means for controlling the gateway to adjust the QoS level for the communications between each of the plurality of apparatuses and the server based on the manufacturing processes.

Aspects of the present disclosure can involve management apparatus configured to manage a system involving a plurality of apparatuses executing manufacturing processes based on instructions from a server, the plurality of apparatuses communicating with the server through a gateway, the apparatus involving a processor, configured to manage a relationship between a Quality of Service (QoS) level for communications and the manufacturing processes; and control the gateway to adjust the QoS level for the communications between each of the plurality of apparatuses and the server based on the manufacturing processes.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In a first example implementation, the QoS management includes a QoS level table and a communication pattern table. The QoS level table associates manufacturing processes with required QoS levels for communications involved in the manufacturing processes. The communication pattern table associates process group ID and communication patterns included in the group ID with a manufacturing process type. By referring to the QoS level table and communication pattern table, the QoS allocator allocates the required QoS level to communication patterns involved in a manufacturing process group. Further, when the operator adds new devices to an existing manufacturing process, the operator only needs to put the communication pattern, manufacturing group ID and manufacturing process type in the communication pattern table. The operator does not need to have detailed required communication QoS information such as how much throughput is needed and how much latency is needed.

Figure 1:
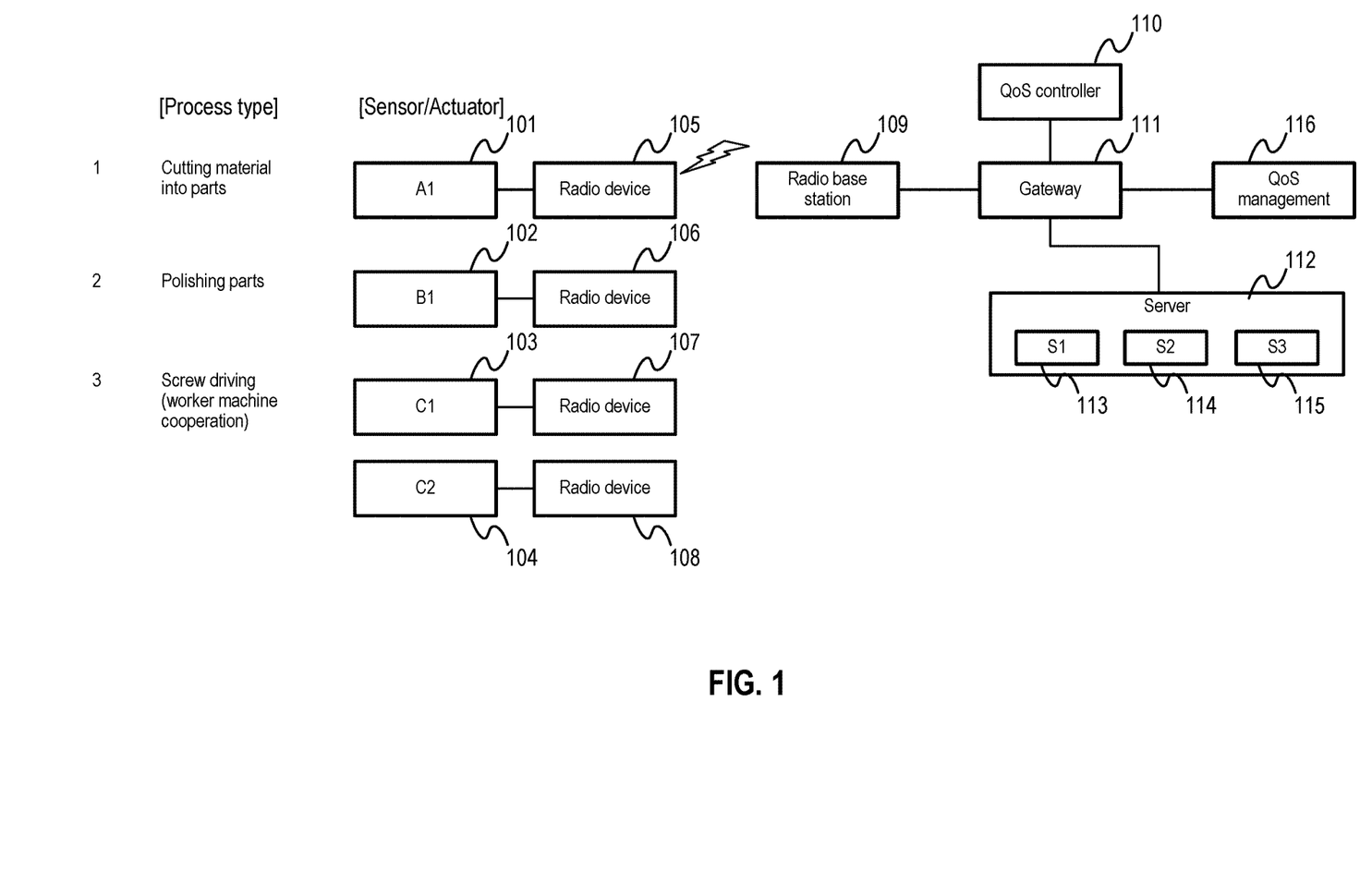
FIG. 1 illustrates an example system architecture upon which example implementations can be applied.

FIG. 1 illustrates an example system architecture upon which example implementations can be applied. The system includes Sensors/Actuators A1 (101), B1 (102), C1 (103), C2 (104), Radio devices (105,106,107,108), Radio base station (109), QoS controller (110), Gateway (111), Server (112) and QoS Management (116).

Sensors/Actuators (101-104) are for producing products in factories and can be associated with various factory apparatuses such as robotic arms, conveyor belts, lathes, presses, and so on in accordance with the desired implementation. The Radio devices (105-108) are for transmitting and receiving information on sensors/actuators (101-104) via the Radio base station (109). The Radio base station (109) sends and receives data to and from the Radio devices (105-108), or transfers data to and from the Gateway (111). The server (112) executes the control program to control the Sensors/Actuators (101-104) and to execute the manufacturing processes. In addition, the server (112) sends and receives data to and from the Radio devices (105-108) via the Gateway (111) and Radio base station (109) while executing control programming. QoS management (116) manages the QoS level to be given to each communication, determines the QoS level, and notifies the level to the QoS controller (110). The QoS controller sets the QoS control policies for the Radio device, Radio base station, Gateway, and Server. Each Radio device, Radio base station (109), Gateway (111), and Server (112) performs priority control of packet forwarding according to the settings made by QoS Controller (110).

In this example Sensor/Actuator A1 (101) executes the process of Cutting material into parts of Group ID 1 in cooperation with the program S1 (113) in Server (112), and Sensor/Actuator B1 (102) executes the process of Polishing parts of Group ID 2 in cooperation with the program S2 (114) in Server (112). Sensor/Actuator C1 and C2 execute screw driving of group ID 3 in cooperation with program S3 (115) in Server. Group ID is an ID for identifying each process.

Figure 2:
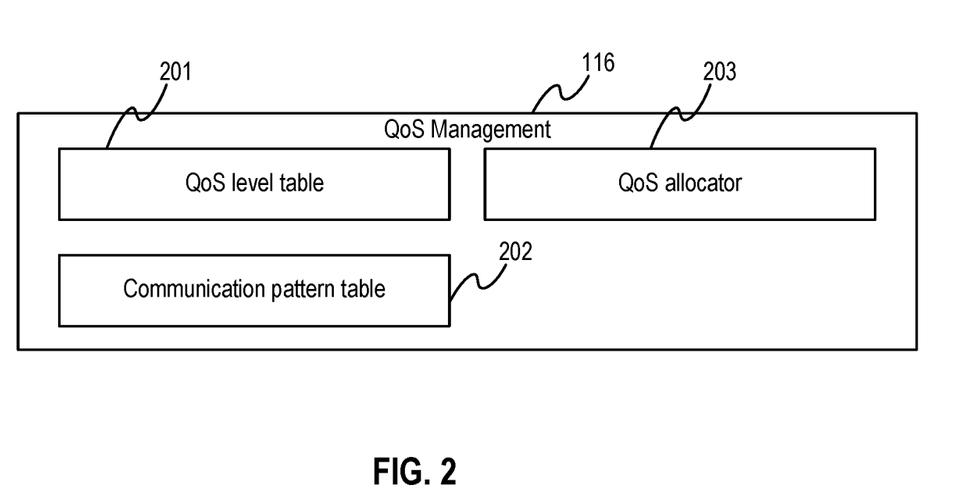
FIG. 2 illustrates the functional block diagram of QoS management, in accordance with an example implementation.

FIG. 2 illustrates the functional block diagram of QoS management (116), in accordance with an example implementation. QoS management (116) includes QoS level table (201), Communication pattern table (202) and QoS allocator (203). QoS level table (201) manages mapping of process type to its required QoS level. Communication pattern table (202) manages mapping of group ID to its process type and communication patterns involved in it. QoS allocator (203) decides QoS level allocated to each communication pattern with referring to QoS level table (201) and Communication pattern table (202) and notifies the decided QoS level allocation to QoS controller (110).

Figure 3:
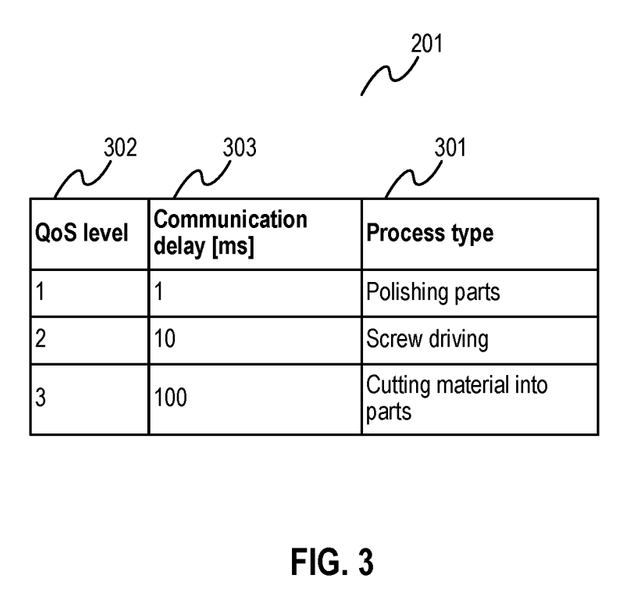
FIG. 3 illustrates an example of QoS level table, in accordance with an example implementation.

FIG. 3 illustrates an example of QoS level table (201), in accordance with an example implementation. The QoS level table (201) includes process type (301), QoS (302), and Communication delay (303). Any metrics related to communication quality such as bandwidth, packet error rate, packet loss rate, or any function thereof can be included in the QoS level table (201) to set the QoS level, in accordance with the desired implementation. The QoS level table (201) shows that QoS level 1 corresponding to communication delay 1 [ms] is allocated to communication patterns involved in Polishing parts, QoS level 2 corresponding to communication delay 10 [ms] is allocated to communication patterns involved in Screw driving and QoS level 3 corresponding to communication delay 100 [ms] is allocated to cutting material into parts. Although the QoS level table (201) controls When the QoS level table is created or modified, the QoS level table is sent via QoS controller to Gateway (111), Radio base station (109), Radio device (105-108), and Server (112). Gateway (111), Radio base station (109), Radio device (105-108) and Server (112) transfer packets according to the QoS level table (201). For example, when the gateway (111) transfers a packet corresponding to QoS level 1, the Gateway (111) transfers it in a way that the end-to-end delay of the packet is less than 1 [ms].

Figure 4:
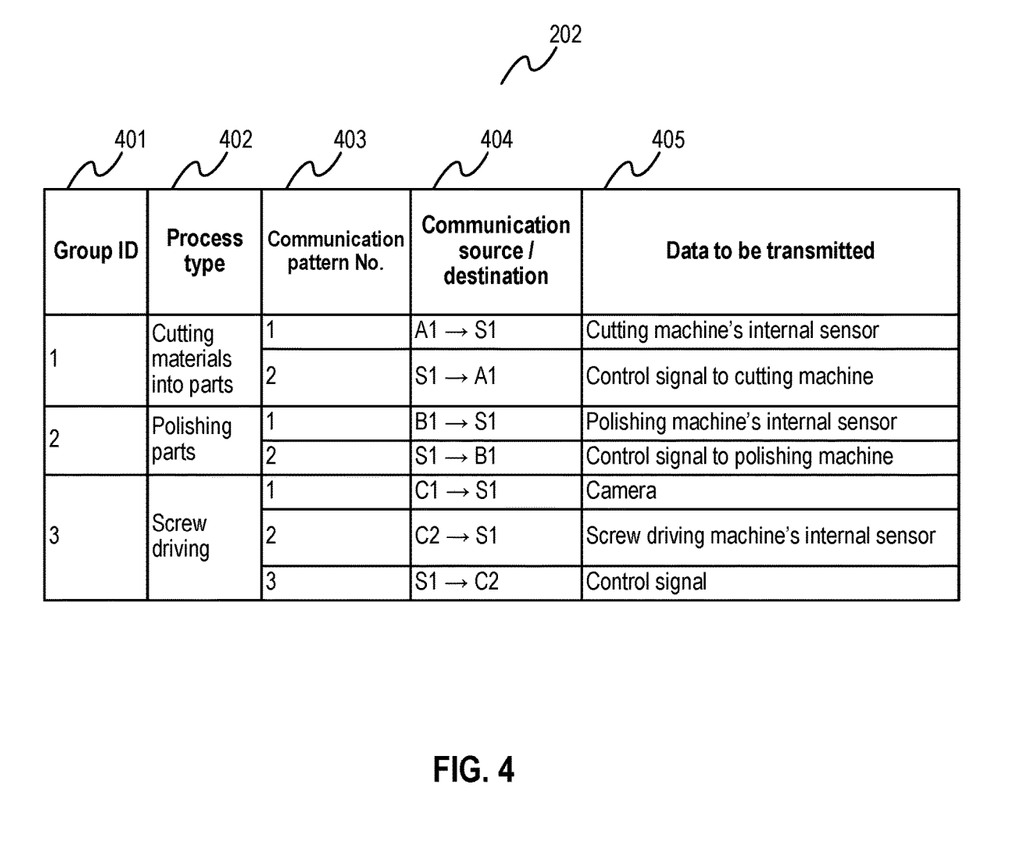
FIG. 4 illustrates an example of communication pattern table, in accordance with an example implementation.

FIG. 4 illustrates an example of communication pattern table (202), in accordance with an example implementation. The communication pattern table (202) includes group ID (401), process type (402), communication pattern number (403) communication source/destination (404) and data to be transmitted (405). The communication pattern table (202) maps each communication pattern to group ID and process type. For example, the communication pattern No. 1 corresponding to the communication from A1 to S1 is associated with group ID 1 and "cutting material into parts".

Figure 5:
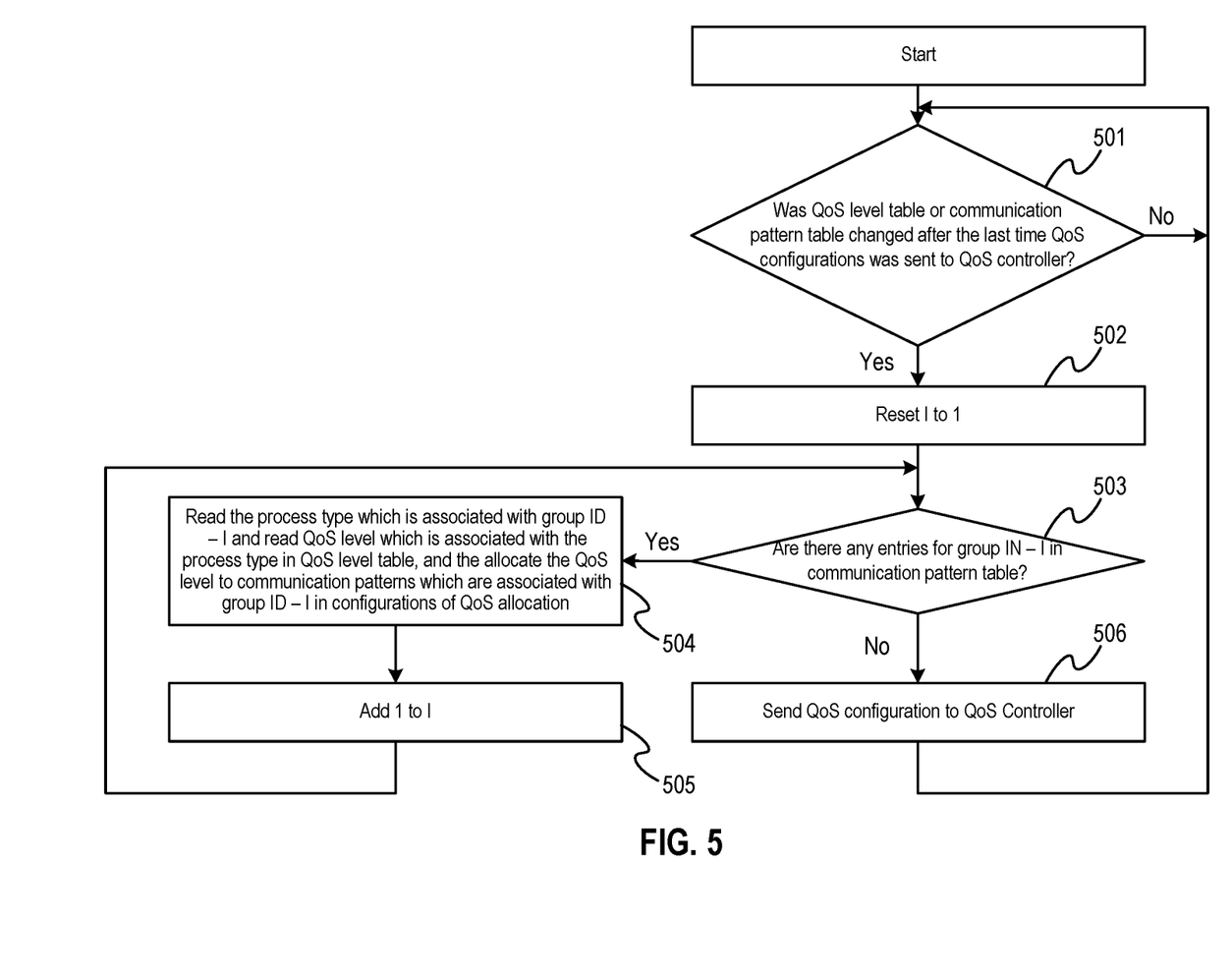
FIG. 5 illustrates a flow chart of QoS allocator, in accordance with an example implementation.
Figure 6:
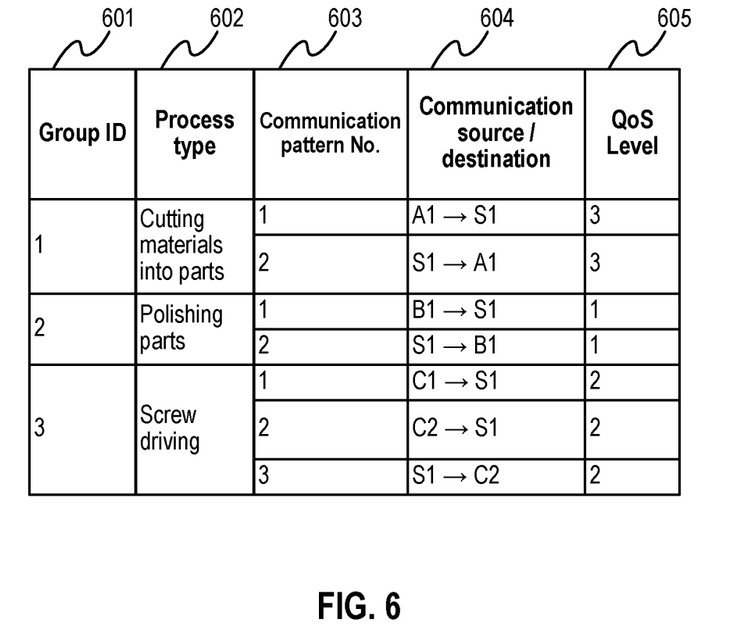
FIG. 6 illustrates example configurations of QoS allocation calculated by QoS allocator, in accordance with an example implementation.

FIG. 5 illustrates a flow chart of QoS allocator, in accordance with an example implementation. FIG. 6 illustrates example configurations of QoS allocation calculated by QoS allocator, in accordance with an example implementation. In the following description of FIG. 5, reference will be made to the configurations illustrated in FIG. 6.

In the step 501, the QoS allocator (203) checks if QoS level table or communication pattern table was changed after the last time QoS configuration was sent to QoS controller (110). If the result of the step 501 is Yes, then the flow proceeds back to 501. If the result of the step 501 is No, then the flow proceeds to step 502.

In the step 502, the QoS allocator (203) resets variable i to 1 and proceeds to the step 503. In the step 503, the QoS allocator (203) checks if there are any entries for Group ID i in the communication pattern table. If the result of the step 503 is No, then the flow proceeds to the step 506. If the result of the step 503 is Yes, then the flow proceeds to the step 504. In the step 504, the QoS allocator (203) reads the process type which is associated with the group ID=I and reads the QoS level associated with the process type in the QoS level table, and then allocates the QoS level to the communication patterns which are associated with group ID=i in the configurations of the QoS allocation.

An example of the operational flow of QoS allocator (203) is explained assuming that the QoS level table in FIG. 3 is applied, communication table in FIG. 4 is applied, and the communication pattern table has changed from the last time QoS configurations were sent to the QoS controller (110).

In the step 501, as the communication pattern table changed from the last time QoS configurations were sent to the QoS controller (110) as mentioned above, the result is Yes. In the step 502, the QoS allocator resets variable i to 1.

In the step 503, as there are entries for group ID=1, the result is YES. In the step 504, the process associated with group ID=1 is cutting material into parts in the communication pattern table and the QoS level associated with cutting material into parts is 1. Accordingly, QoS level 3 is allocated to the communication patterns A1→S1 and S1→A1 as shown in FIG. 6 and the QoS allocator (203) proceeds to the step 505. In the step 505, the QoS allocator adds 1 to i and i becomes 2, then the QoS allocator (203) proceeds to the step 503.

In the step 503, as there are entries for group ID=2, the result is YES. In the step 504, the process associated with group ID=2 is polishing parts in the communication pattern table and the QoS level associated with polishing parts is 3. Accordingly, QoS level 1 is allocated to the communication patterns B1→Ω and S2→B1 as shown in FIG. 6 and the QoS allocator (203) proceeds to the step 505. In the step 505, the QoS allocator (203) adds 1 to i and i becomes 3, then the QoS allocator (203) moves on to the step 503.

In the step 503, as there are entries for group ID=3, the result is YES. In the step 504, the process associated with group ID=2 is screw driving in the communication pattern table and the QoS level associated with screw driving is 2. Accordingly, QoS level 2 is allocated to the communication patterns C1→S3, C2→S3 and S3→C2 as shown in FIG. 6 and the QoS allocator proceeds to the step 505. In the step 505, the QoS allocator adds 1 to i and i becomes 4, then the QoS allocator moves on to the step 503.

In the step 503, as there are not any entries for group ID=4, the result is No. In the step 506, the QoS allocator (203) sends updated QoS configurations shown in FIG. 3 to the QoS controller (110). As illustrated therein, through the updates received to the communication patterns of FIG. 6, the QoS level of FIG. 3 and the communication pattern of FIG. 6 can thereby be modified by the QoS management 116. Through the use of management information of FIG. 3 and FIG. 6, the QoS controller (110) can thereby process and facilitate each communication based on the communication pattern to determine the underlying process, and then determine the appropriate QoS level for the communication.

When an additional sensor/actuator is installed for an existing process (e.g., already defined in the QoS configurations defined in FIG. 3), the operator inputs communication patterns related to the sensor/actuator in the communication pattern table as illustrated in FIG. 4. When an additional process with a new group ID having a process type and QoS level already defined in the QoS table is installed, the operator inputs the new group ID, process type and the communication patterns. Through such example implementations, the operator therefore does not need to consider what QoS level needs to be allocated to the communication patterns, and the QoS configurations shown in FIG. 3 can thereby be used to assign the appropriate QoS level efficiently.

According to this example execution, it is possible to allocate the communication QoS required by the process to communication patterns involved in the process. Further, when additional processes to which QoS level corresponds has been already registered in QoS level table are introduced or additional sensors/actuators are installed for existing, operators can easily put QoS configurations for them without considering what QoS is needed from them.

In a second example implementation, it is assumed that the performance of process involving worker-machine collaboration is improved when the higher QoS level is allocated to its communication patterns than they require. The QoS level table includes a worker-machine collaboration column (Yes/No), a maximum QoS resource column, and a currently available QoS resource column in addition to the columns included in the QoS level table shown in the first example implementation. The QoS allocator allocates a QoS level to the communication patterns based on availability of each QoS level in the QoS level table. The QoS allocator allocates higher QoS level to communication patterns involved in human-machine collaboration process than those the worker-machine collaboration process requires if a higher QoS level is available after the QoS level is allocated to all the communication patterns. The performance of process involving worker-machine collaboration is improved with the performance of non-worker-machine collaboration processes maintained in a second example implementation.

The QoS level table in this execution example includes a worker-machine collaboration column (Yes/No), a maximum QoS resource column and a currently available QoS resource column in addition to the columns included in the QoS level table shown in the first example implementation.

Figure 7:
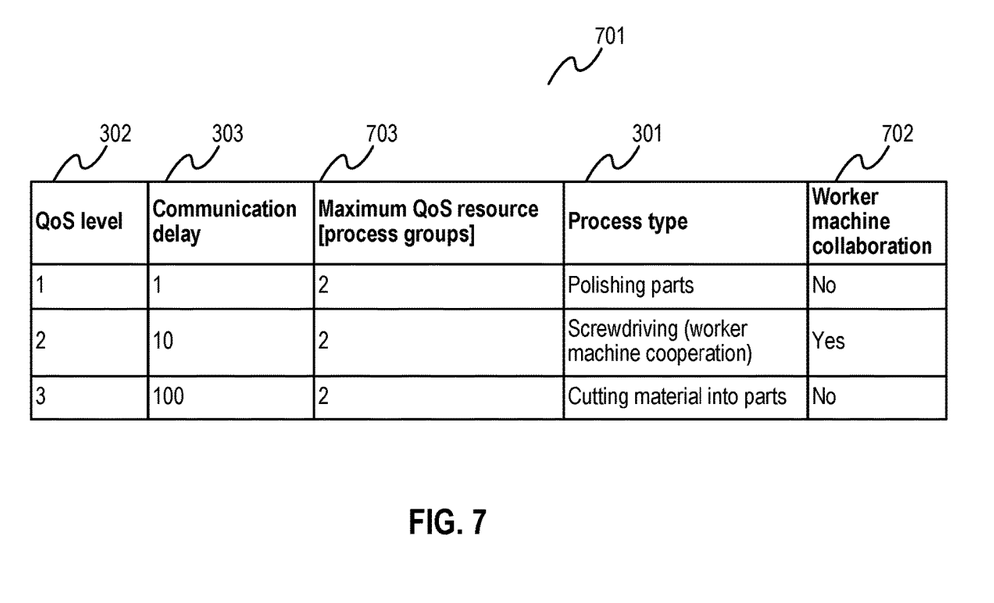
FIG. 7 illustrates an example of a QoS level table, in accordance with an example implementation.

FIG. 7 illustrates an example of a QoS level table, in accordance with an example implementation. QoS level table (701) includes worker-machine collaboration (702), maximum QoS resource (703) and current available QoS resource (704). Worker-machine collaboration column (702) indicates whether a process involves worker-machine collaboration. Maximum QoS resource column (703) indicates how many process groups at maximum QoS level is available for. Currently available QoS resource column (704) indicates how many process groups are currently available for assignment for the QoS level.

The QoS allocator (203) in this example allocates QoS level in two phases.

In the first phase, the QoS allocator (203) allocates QoS level to communication patterns in each process group based on the required QoS shown in QoS level (302) column as long as the QoS level resource is available. In the second phase, the QoS allocator (203) reallocates a higher QoS level to the process involving worker-machine collaboration if a higher QoS level resource is available.

Figure 8:
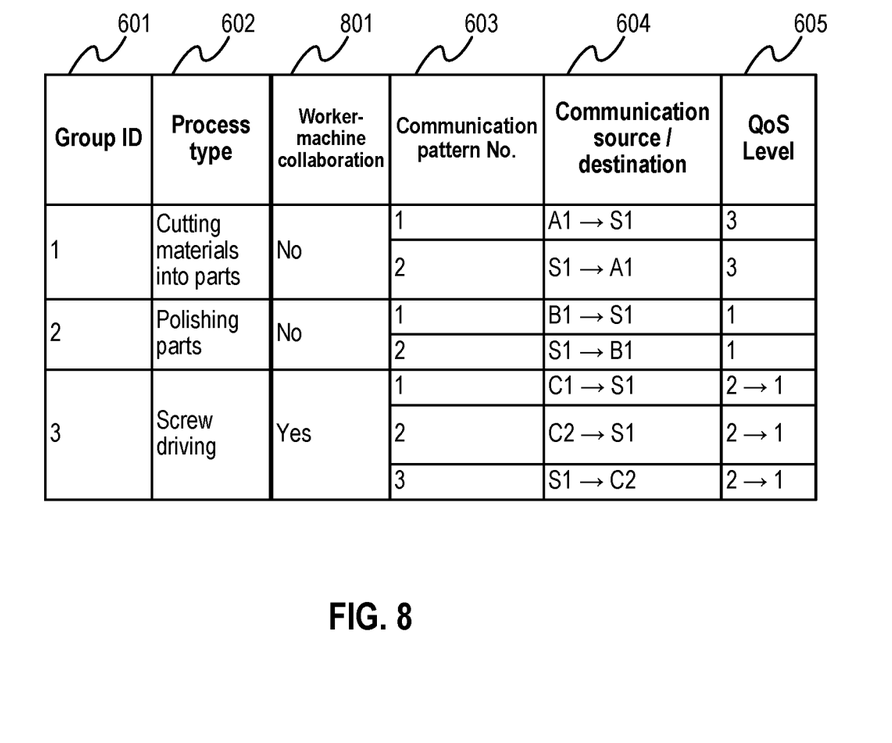
FIG. 8 illustrates an example of QoS configurations, in accordance with an example implementation.

The concrete operational flow of QoS allocator (203) is described with respect to the communication pattern table shown in FIG. 4, the QoS level table shown in FIG. 7 and the QoS configurations shown in FIG. 8. Referring to FIG. 7 each QoS level has two available resources at maximum. In the first phase of QoS allocation, the QoS allocator (203) allocates required QoS level to communication patterns. QoS level 3 is allocated to group ID 1 (cutting material into parts), QoS level 1 is allocated to group ID 2 (polishing parts) and QoS level 2 is allocated to group ID 3 (screw driving) as in the first example implementation. Here, the current available resource of QoS level 1 is 1, the current available resource of QoS level 2 is 1 and the current available resource of QoS level 3 is 1 shown in FIG. 7. In the second phase, the QoS allocator (203) reallocates a higher QoS level to the process involving worker-machine collaboration if higher QoS level resource is available. In this case, only group ID 3 involves worker-machine collaboration, so the QoS allocator checks higher QoS availability for the group ID 3. Required QoS level from group ID 3 is 2, so the QoS allocator (203) checks the availability of QoS level 1 and there is 1 available resource of QoS level 1. Accordingly, the QoS allocator (203) allocates QoS level 1 to group ID 3 instead of QoS level 2 as shown in FIG. 8.

The performance of process involving worker-machine collaboration is improved with the performance of non-worker-machine collaboration processes maintained in the second example implementation.

In a third example implementation, it is assumed that the performance of process is improved when the higher than required QoS level is allocated to communication patterns. In this example, the QoS level table is the same as that in the second example implementation, which has a maximum QoS resource column and current available QoS column. The communication pattern table in this example includes progress column (on time/delayed) in addition to the columns in the communication pattern table shown in the first example implementation. The QoS allocator allocates the QoS level to communication patterns based on availability of each QoS level in the QoS level table. The QoS allocator allocates a higher than required QoS level indicated in the QoS level table to the communication patterns in a "delayed" process if a higher QoS level is available after the QoS level is allocated to all the communication patterns. The performance of the delayed process is improved with the performance of the other processes maintained in the third example implementation.

The QoS level table is the same as that in second example implementation having a maximum QoS resource column and currently available QoS column. The communication pattern table in this example includes a progress column (on time/delayed) in addition to the columns in the communication pattern table shown in the first example implementation.

Figure 9:
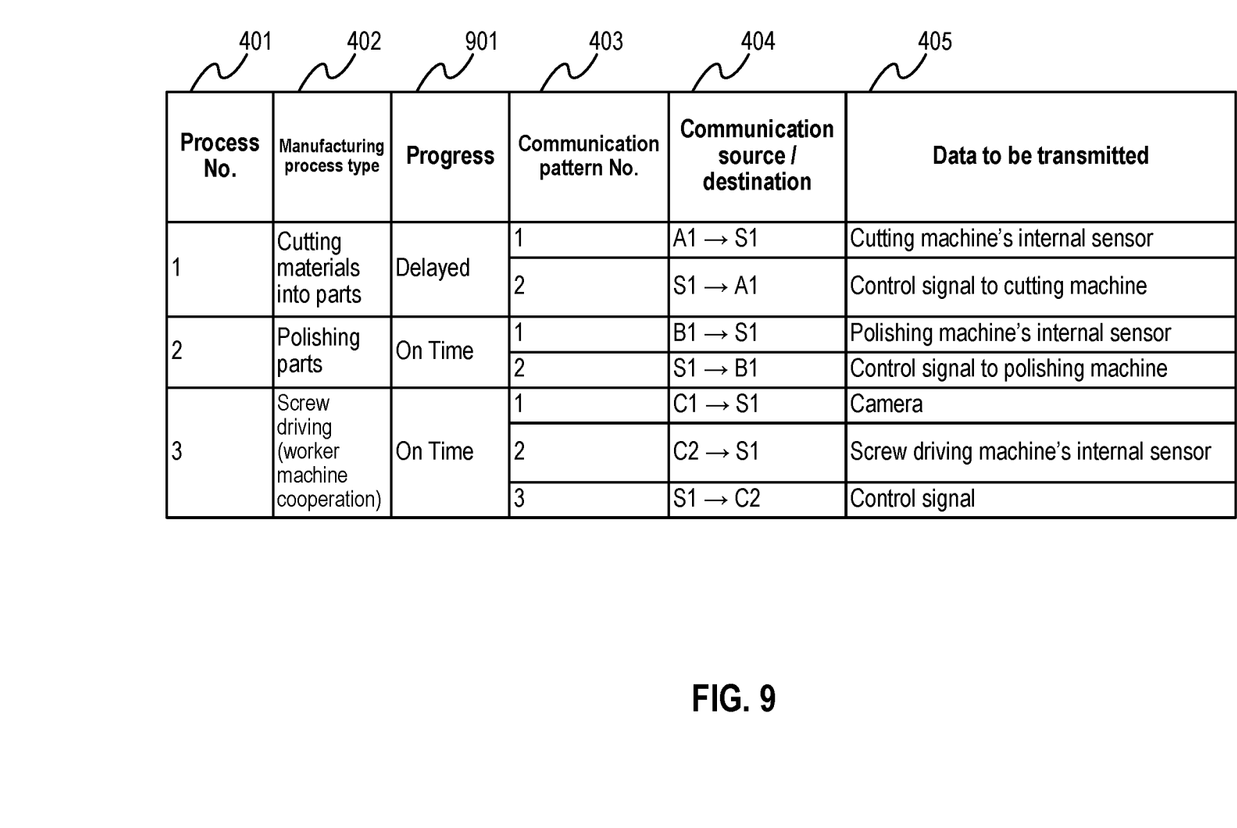
FIG. 9 illustrates an example of a communication pattern table, in accordance with an example implementation.

FIG. 9 illustrates an example of communication pattern table, in accordance with an example implementation. The progress column (901) indicates the progress of process, such as "on time" or "delayed". The QoS allocator in this example allocates the QoS level in two phases.

In the first phase, the QoS allocator (203) allocates a QoS level to communication patterns in each process group based on required QoS shown in QoS level (302) column as long as the QoS level resource is available. In the second phase, the QoS allocator (203) reallocates a higher QoS level to the process whose progress is "delayed" if a higher QoS level resource is available.

Figure 10:
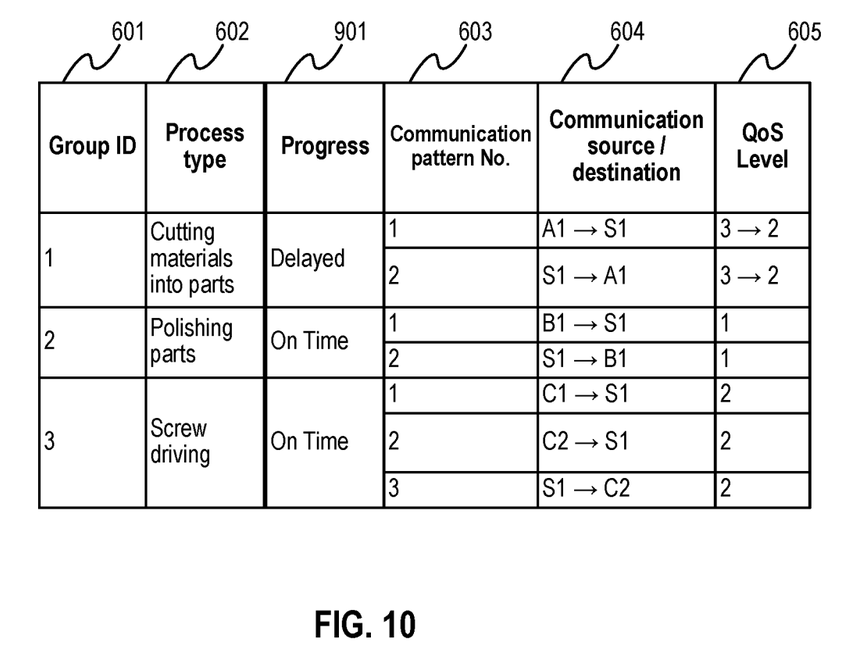
FIG. 10 illustrates an example of QoS configurations, in accordance with an example implementation.

The operational flow of QoS allocator (203) is described below with respect to the communication pattern table shown in FIG. 9, the QoS level table shown in FIG. 7 and the QoS configurations shown in FIG. 10. Referring to FIG. 7, each QoS level has two available resources at maximum. In the first phase of the QoS allocation, the QoS allocator (203) allocates the required QoS level to communication patterns. QoS level 3 is allocated to group ID 1 (cutting material into parts), QoS level 1 (polishing parts) is allocated to group ID 2 and QoS level 2 is allocated to group ID 3 (screw driving) as in the example execution 1. Here, the current available resource of QoS level 1 is 1, the current available resource of QoS level 2 is 1 and the current available resource of QoS level 3 is 1 shown in FIG. 7. In the second phase, the QoS allocator (203) reallocates a higher QoS level to the process whose progress is "delayed" if a higher QoS level resource is available. In this case, only group ID 1's progress is "delayed", so the QoS allocator checks for a higher QoS availability for the group ID 2. The required QoS level from group ID 1 is 3, so the QoS allocator checks QoS level 2 availability and finds that there is one available resource of QoS level 2. Accordingly, the QoS allocator allocates QoS level 2 to group ID 1 instead of QoS level 3 as shown in FIG. 10.

The performance of delayed process is improved with the performance of the other processes maintained in the third example implementation.

Through the example implementations described herein, aa method to allocate optimal QoS level to each device in manufacturing field can be facilitated.

Figure 11:
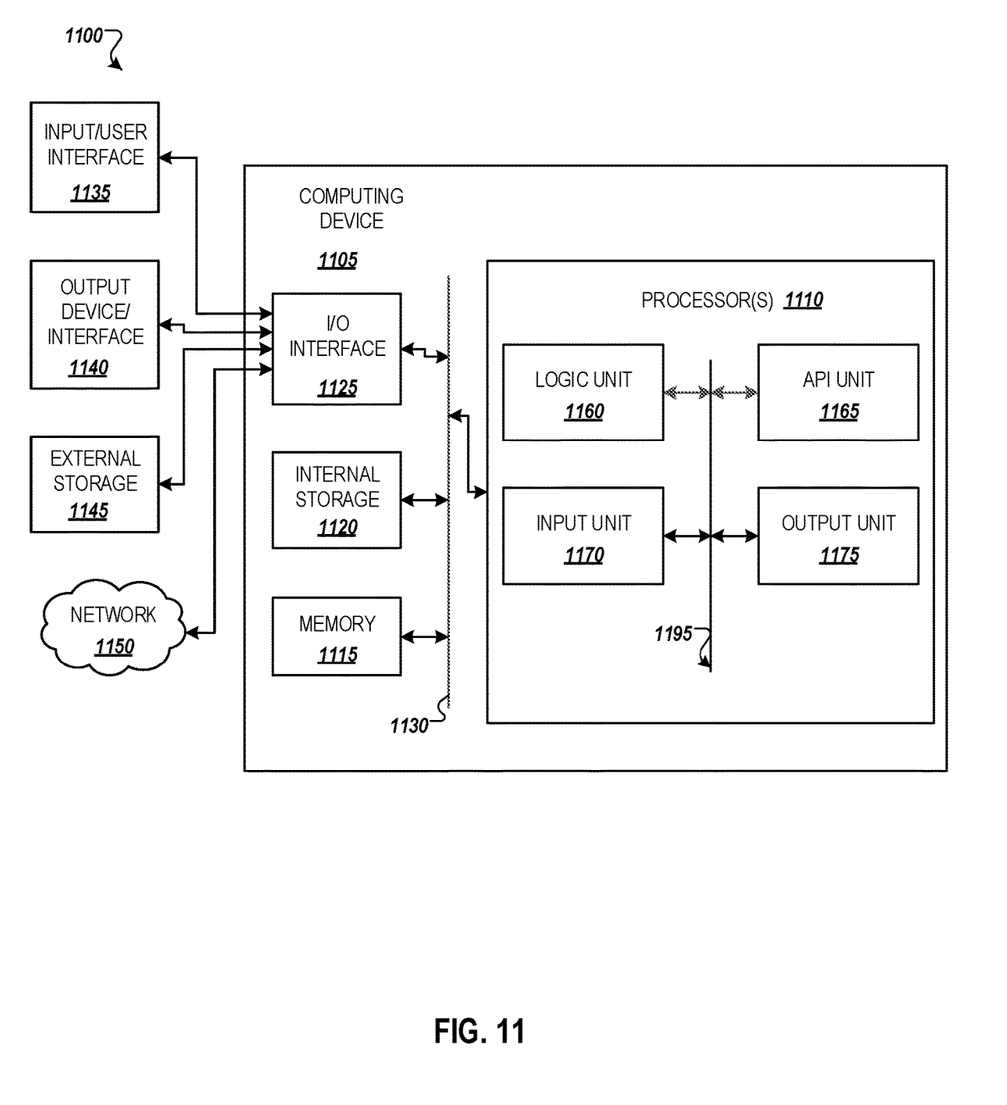
FIG. 11 illustrates an example computing environment with an example computer device suitable for use in some example implementations.

FIG. 11 illustrates an example computing environment with an example computer device suitable for use in some example implementations, such as a management apparatus configured to facilitate the functionality of QoS management 116.

Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computer device 1105. I/O interface 1125 is also configured to receive images from cameras or provide images to projectors or displays, depending on the desired implementation.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via I/O interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

Processor(s) 1110 can be configured to manage (e.g., in memory 1115) a relationship between a Quality of Service (QoS) level for communications and the manufacturing processes as illustrated in FIG. 3 and FIG. 7; and control the gateway 111 to adjust the QoS level for the communications between each of the plurality of apparatuses and the server based on the manufacturing processes as illustrated in FIG. 1 through use of providing the management information of FIG. 3 and FIG. 7 to the QoS controller 110. In an example implementation to control the gateway to adjust the QoS level, processor(s) 1110 can be configured to, for each communication received, determine the QoS level for the apparatus from the management information of FIG. 3 and FIG. 7 based on the communication patterns illustrated, for example, in FIGS. 4 and 6, and transmit the management information to QoS controller 110. Gateway 111 can thereby control the QoS level according to the management level in FIG. 3 and FIG. 7 and communication patterns in FIG. 4 and FIG. 6, as instructed by QoS controller 110 based on the underlying manufacturing process.

In an example implementation, the QoS level can be based on communication delay as illustrated in FIG. 3 and FIG. 7.

Processor(s) 1110 can be configured to, for input of information indicative of a modification to the plurality of apparatuses or the manufacturing processes, control the gateway to adjust the QoS level of ones of the plurality of apparatuses associated with the modification based on the manufacturing processes executed by the ones of the plurality of apparatuses according to the relationship as illustrated through the execution of the flow of FIG. 5 based on management information as illustrated in the examples of FIGS. 3-4, and FIGS. 6-10.

Processor(s) 1110 can be configured to, for ones of the plurality of apparatuses executing a worker-machine collaboration manufacturing process, determine whether a higher QoS level is available; and for a determination that a higher QoS level is available, control the gateway to adjust the QoS level for the ones of the plurality of apparatuses to the higher QoS level as illustrated in FIG. 1 through use of the management information of FIG. 7.

Processor(s) 1110 can be configured to, for ones of the plurality of apparatuses being delayed in executing the manufacturing processes, determine whether a higher QoS level is available; and for a determination that a higher QoS level is available, control the gateway to adjust the QoS level for the ones of the plurality of apparatuses to the higher QoS level as illustrated in FIG. 1 through the use of the management information as illustrated in the examples of FIG. 9.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for management of a system involving a plurality of apparatuses executing manufacturing processes based on instructions from a server, the plurality of apparatuses communicating with the server through a gateway, the method comprising:
   managing a relationship between a Quality of Service (QoS) level for communications and the manufacturing processes; and
   controlling the gateway to adjust the QoS level for the communications between each of the plurality of apparatuses and the server based on the manufacturing processes,
   wherein the managing includes allocating the QoS level to communication patterns involved in each manufacturing process group of the manufacturing processes by referring to a QoS level table, which associates the manufacturing processes with the QoS level for the communication involved in each of the manufacturing processes, and a communication pattern table, which associates a process group ID and the communication patterns included in the process group ID with a type of each of the manufacturing processes.

2. The method of claim 1, wherein the QoS level is based on communication delay.

3. The method of claim 1, further comprising:
   for input of information indicative of a modification to the plurality of apparatuses or the manufacturing processes, controlling the gateway to adjust the QoS level of ones of the plurality of apparatuses associated with the modification based on the manufacturing processes executed by the ones of the plurality of apparatuses according to the relationship.

4. The method of claim 1, further comprising:
   for ones of the plurality of apparatuses executing a worker-machine collaboration manufacturing process, determining whether a higher QoS level is available; and
   for a determination that a higher QoS level is available, controlling the gateway to adjust the QoS level for the ones of the plurality of apparatuses to the higher QoS level.

5. The method of claim 1, further comprising:
   for ones of the plurality of apparatuses being delayed in executing the manufacturing processes, determining whether a higher QoS level is available; and
   for a determination that a higher QoS level is available, controlling the gateway to adjust the QoS level for the ones of the plurality of apparatuses to the higher QoS level.

6. A non-transitory computer readable medium, storing instructions for management of a system involving a plurality of apparatuses executing manufacturing processes based on instructions from a server, the plurality of apparatuses communicating with the server through a gateway, the instructions comprising:
   managing a relationship between a Quality of Service (QoS) level for communications and the manufacturing processes; and
   controlling the gateway to adjust the QoS level for the communications between each of the plurality of apparatuses and the server based on the manufacturing processes,
   wherein the managing includes allocating the QoS level to communication patterns involved in each manufacturing process group of the manufacturing processes by referring to a QoS level table, which associates the manufacturing processes with the QoS level for the communication involved in each of the manufacturing processes, and a communication pattern table, which associates a process group ID and the communication patterns included in the process group ID with a type of each of the manufacturing processes.

7. The non-transitory computer readable medium of claim 6, wherein the QoS level is based on communication delay.

8. The non-transitory computer readable medium of claim 6, further comprising:
   for input of information indicative of a modification to the plurality of apparatuses or the manufacturing processes, controlling the gateway to adjust the QoS level of ones of the plurality of apparatuses associated with the modification based on the manufacturing processes executed by the ones of the plurality of apparatuses according to the relationship.

9. The non-transitory computer readable medium of claim 6, further comprising:

for ones of the plurality of apparatuses executing a worker-machine collaboration manufacturing process, determining whether a higher QoS level is available; and for a determination that a higher QoS level is available, controlling the gateway to adjust the QoS level for the ones of the plurality of apparatuses to the higher QoS level.

10. The non-transitory computer readable medium of claim 6, further comprising:

for ones of the plurality of apparatuses being delayed in executing the manufacturing processes, determining whether a higher QoS level is available; and for a determination that a higher QoS level is available, controlling the gateway to adjust the QoS level for the ones of the plurality of apparatuses to the higher QoS level.

11. A management apparatus configured to manage a system involving a plurality of apparatuses executing manufacturing processes based on instructions from a server, the plurality of apparatuses communicating with the server through a gateway, the apparatus comprising:

a processor configured to:

manage a relationship between a Quality of Service (QoS) level for communications and the manufacturing processes; and control the gateway to adjust the QoS level for the communications between each of the plurality of apparatuses and the server based on the manufacturing processes, wherein the processor is configured to manage the relationship by allocating the QoS level to communication patterns involved in each manufacturing process group of the manufacturing processes by referring to a QoS level table, which associates the manufacturing processes with the QoS level for the communication involved in each of the manufacturing processes, and a communication pattern table, which associates a process group ID and the communication patterns included in the process group ID with a type of each of the manufacturing processes.

12. The management apparatus of claim 11, wherein the QoS level is based on communication delay.

13. The management apparatus of claim 11, the processor configured to:

for input of information indicative of a modification to the plurality of apparatuses or the manufacturing processes, control the gateway to adjust the QoS level of ones of the plurality of apparatuses associated with the modification based on the manufacturing processes executed by the ones of the plurality of apparatuses according to the relationship.

14. The management apparatus of claim 11, the processor further configured to:

for ones of the plurality of apparatuses executing a worker-machine collaboration manufacturing process, determine whether a higher QoS level is available; and for a determination that a higher QoS level is available, control the gateway to adjust the QoS level for the ones of the plurality of apparatuses to the higher QoS level.

15. The apparatus of claim 11, the processor further configured to:

for ones of the plurality of apparatuses being delayed in executing the manufacturing processes, determine whether a higher QoS level is available; and for a determination that a higher QoS level is available, control the gateway to adjust the QoS level for the ones of the plurality of apparatuses to the higher QoS level.

* * * * *